Patented Aug. 13, 1940

2,211,704

UNITED STATES PATENT OFFICE 2,211,704

PROCESS FOR TREATING FRIEDEL-CRAFTS REACTION LIQUORS

Harold A. Robinson, Midland, Mich., assignor to The Dow Chemical Company, Midland, Mich., a corporation of Michigan No Drawing. Application February 15, 1939,
Serial No. 256,600

11 Claims. (Cl. 260—671)

The present invention relates to a process for the removal of dispersed organo-metal halide complex catalysts from Friedel-Crafts reaction liquors.

As is well known, the active catalyst in a Friedel-Crafts reaction is not the metal halide originally added, but is an organo-metal halide complex compound which is usually present as a brown sludge-like mass suspended in the reaction liquor. For example, in the preparation of alkylated aromatic compounds according to the Friedel-Crafts synthesis, the usual procedure is to introduce an olefin or alkyl halide into an agitated mixture of an aromatic hydrocarbon or halohydrocarbon and such an organo-metal halide complex catalyst. Then, when the desired amount of alkylating agent has been added, agitation of the reaction mixture is discontinued. The major portion of the suspended catalyst settles to the bottom of the reaction vessel and may be withdrawn for re-use in subsequent alkylations. However, an appreciable quantity of the organo-metal halide complex catalyst never settles from the reaction liquor, but remains dissolved or otherwise dispersed in the crude reaction product, and cannot be removed by physical means.

The presence of dispersed catalyst in the crude product greatly complicates the separation and purification of the compounds formed in the reaction, particularly in large scale or continuous operation. Thus when attempt is made to separate the individual products of reaction by fractional distillation without first removing the dispersed organo-metal halide, this material tends to catalyze decomposition and rearrangement of the alkylated products during the distillation process, and hence to reduce the yields of the desired compounds. Further, the dispersed catalyst itself tends to decompose on the heating surfaces of the distilling apparatus, forming tars and scaly deposits which decrease the rate of heat transfer through the still body and necessitate frequent cleaning operations.

To avoid these difficulties, it is customary to wash the crude alkylated product with a large excess of cold water or aqueous alkali in order to dissolve out or destroy the dispersed organo-metal halide catalyst prior to the distillation step. Unfortunately this procedure is disadvantageous in that the treatment with water or aqueous solutions tends to wet the crude product. The presence of such moisture greatly reduces the efficiency of the subsequent distillation and introduces serious equipment corrosion problems unless an expensive drying step is first carried out. Moreover, the washing operation frequently entails other difficulties resulting from emulsification of the aqueous phase in the crude alkylated product. All these drawbacks have somewhat limited the application of the Friedel-Crafts reaction to industrial chemical syntheses.

The chief object of the present invention is to provide a method for removing the dispersed organo-metal halide complex catalyst from Friedel-Crafts reaction liquors which eliminates the distillation difficulties hereinbefore mentioned and at the same time avoids the disadvantages of catalyst removal with a large volume of water or aqueous solutions.

According to the invention, a dispersed organo-metal halide catalyst may be effectively removed from a Friedel-Crafts reaction liquor by treating the latter under controlled conditions with a proportion of water just sufficient to react with the catalyst without wetting the liquor. The dispersed organo-metal catalyst is thereby converted to a flocculent precipitate which has no catalytic properties and does not interfere with subsequent distillation or other treatment of the alkylation liquor.

For example, in an alkylation process utilizing the invention, an olefin or alkyl halide is first reacted with an aromatic hydrocarbon or halohydrocarbon according to the usual Friedel-Crafts procedure, in either a batchwise or a continuous manner. After reaction, the resulting liquor is usually allowed to stand for some time to permit settling and removal of the bulk of the sludge-like organo-metal halide catalyst, although this step is not essential. Then, according to the invention, the crude reaction product containing the remaining dispersed organo-metal halide complex catalyst is treated with a small proportion of water just sufficient to remove the catalyst without wetting the product, as hereinafter explained. This small quantity of water undergoes a rapid chemical reaction with the dispersed catalyst complex, forming a flocculent precipitate which is thought to be a hydrated metal halide or a metal hydroxide. The precipitate settles to the bottom of the reaction vessel and may be removed, if desired, by filtration or otherwise. The crude alkylation liquor may then be fractionally distilled in the customary manner to separate the alkylated products without danger of catalytic decomposition and without the disadvantages of attempting to distill a wet product.

In practice, the water introduced in small proportion into the crude alkylated product may be in liquid or vapor form. Liquid water may be added as such or dissolved in any inert solvent miscible with the reaction liquor. Water vapor may be introduced either as steam or in the form of a humid inert gas, such as moist air. In any case, the reaction liquor and water should be mixed in a zone of powerful agitation, so as to prevent the existence of any appreciable aqueous phase which might enable the added water to wet the liquor rather than merely to react with the catalyst dispersed in the liquor. In carrying out the treatment, it is not usually necessary to adjust the temperature of the crude alkylated product before the water is added, since the process is operable at any temperature between about 0° C. and about 150° C. In many instances, however, e. g. in the preparation of ethylbenzene, temperatures of 10° C. to 75° C. are preferable.

The proportion of water to be employed in carrying out the process is that amount which is chemically equivalent to, and hence is just enough to react with, the organo-metal halide catalyst present in the crude alkylation product. A very slight excess of water is not seriously disadvantageous, but any appreciable excess is to be avoided, since it tends to wet the crude alkylated product and hence to interfere with subsequent distillation. The exact proportion of water to be added cannot be stated in advance, inasmuch as it depends upon the particular reaction being carried out, the precise nature of the catalyst employed, the concentration of catalyst, and the reaction conditions. In general, however, an amount is required corresponding to between about 0.2 and about 12.0 gram-moles of water per gram-atom of metal present in the catalyst to be removed. When the dispersed catalyst complex is present in ordinary concentration, i. e. after the bulk of the catalyst has been allowed to settle, the required proportion of water is usually between about 0.001 and 0.2 part by weight of water per 100 parts of crude reaction liquor.

In any given reaction, the exact proportion of water to be employed may easily be determined by withdrawing an aliquot portion of the crude product and experimentally measuring, e. g. by titration, the quantity of water required just to precipitate all the catalyst. As a matter of convenience, however, it is often preferable to control the addition of water with reference to the electrical conductivity of the crude product. For example, in an alkylation such as the preparation of ethylbenzene by the reaction of ethylene with benzene in the presence of an aluminum chloride complex catalyst, the crude alkylated benzene containing dispersed organo-aluminum chloride complex catalyst has a measurable specific electrical conductivity, usually about $50 \times 10^{-12}$ mhos per cubic centimeter at 25° C. When small portions of water are added to precipitate the dispersed catalyst complex, this electrical conductivity decreases as more and more of the catalyst is precipitated. When a quantity of water just equivalent to all the catalyst has been added, i. e. when the catalyst has all been precipitated, the electrical conductivity is at a minimum value, usually less than about $8 \times 10^{-12}$ mhos per cubic centimeter. Further addition of water tends rapidly to wet the product, and thus to raise the electrical conductivity again, usually to a value of more than $20 \times 10^{-12}$ mhos per cubic centimeter. In carrying out this process, then, water is added to the crude alkylated benzene product until the specific electrical conductivity is less than about $8 \times 10^{-12}$ mhos per cubic centimeter at 25° C., at which conductivity precipitation of the dispersed catalyst is substantially complete, but no excess water is present.

The process described is particularly adapted to the removal of dispersed complex catalysts from alkylation liquors formed in the reaction of lower olefins or lower alkyl monohalides, such as ethylene, propylene, isobutylene, ethyl chloride, isopropyl bromide, mixtures of these substances, etc., with aromatic hydrocarbons or halohydrocarbons, such as benzene, ethylbenzene, chlorobenzene, isopropyl brombenzene, naphthalene, etc. In so far as I am aware, however, the process may be applied to the precipitation of the dispersed organo-metal halide complex catalyst from any Friedel-Crafts reaction liquor. The treatment is applicable to the removal not only of aluminum chloride complexes, but also of organo-metal halide complex catalysts formed from other metal halides of the Friedel-Crafts type, e. g. aluminum bromide, ferric chloride, stannic chloride, antimony trichloride, etc.

It will be appreciated from the foregoing that the invention provides a simple process for removing dispersed organo-metal halide complex catalysts from Friedel-Crafts alkylation liquors and hence eliminates the distillation difficulties inherent in prior art procedures. At the same time the new process is operated without wetting the crude product and thus avoids the disadvantages of catalyst removal by the use of aqueous solutions.

The term "water" as herein employed and as used in the following claims, refers to water both in the liquid and in the vapor states.

Other modes of applying the principle of the invention may be employed instead of those explained, change being made as regards the details hereinbefore disclosed, provided the steps stated by any of the following claims or the equivalent of such stated steps be employed.

I claim:

1. The process for removing a dispersed organo-metal halide complex catalyst of the Friedel-Crafts type from a Friedel-Crafts reaction liquor which comprises mixing water with said liquor in a proportion just sufficient to precipitate all the catalyst dispersed in said liquor but insufficient to wet said liquor.

2. The process for removing a dispersed organo-metal halide complex catalyst of the Friedel-Crafts type from a Friedel-Crafts reaction liquor which comprises mixing with said liquor a small proportion of water in a quantity approximately chemically equivalent to the quantity of catalyst dispersed in said liquor.

3. The process for removing a dispersed organo-metal halide complex catalyst of the Friedel-Crafts type from a Friedel-Crafts reaction liquor which comprises mixing water with said liquor in an amount of between about 0.001 and about 0.2 part by weight of water per 100 parts of said liquor.

4. The process for removing a dispersed organo-metal halide complex catalyst of the Friedel-Crafts type from a Friedel-Crafts reaction liquor which comprises mixing a small proportion of water with said liquor, said water being added in an amount of between about 0.2 and about 12.0 gram-moles of water per gram-atom of metal present in the organo-metal halide catalyst dispersed in said liquor, but in a quantity insufficient to wet the liquor.

5. In a process for the preparation of alkylated aromatic compounds wherein an alkylating agent selected from the class consisting of lower olefins and lower alkyl monohalides is reacted with a compound selected from the class consisting of aromatic hydrocarbons and halohydrocarbons in the presence of an organo-metal halide complex catalyst of the Friedel-Crafts type to form a crude alkylated product, the step of removing dispersed organo-metal halide complex catalyst from the crude alkylated product which comprises treating said crude product with a proportion of water just sufficient to precipitate the catalyst dispersed in said product but insufficient to wet said product.

6. In a process for the preparation of alkylated aromatic compounds wherein an alkylating agent selected from the class consisting of lower olefins and lower alkyl monohalides is reacted with a compound selected from the class consisting of aromatic hydrocarbons and halohydrocarbons in the presence of an organo-metal halide complex catalyst of the Friedel-Crafts type to form a crude alkylated product, the step of removing dispersed organo-metal halide complex catalyst from the crude alkylated product which comprises mixing a small proportion of water with said crude product in an amount of between about 0.001 and about 0.2 part by weight of water per 100 parts of said product.

7. In a process for the preparation of alkylated aromatic compounds wherein an alkylating agent selected from the class consisting of lower olefins and lower alkyl monohalides is reacted with a compound selected from the class consisting of aromatic hydrocarbons and halohydrocarbons in the presence of an organo-metal halide complex catalyst of the Friedel-Crafts type to form a crude alkylated product, the step of removing dispersed organo-metal halide complex catalyst from the crude alkylated product which comprises mixing a small proportion of water with said crude product at a temperature between about 20° C. and about 150° C., said water being added in the proportion of between about 0.2 and about 12.0 gram-moles of water per mole of catalyst dispersed in said product, but in a quantity insufficient to wet the crude product.

8. In a process for the preparation of alkylated aromatic compounds wherein an alkylating agent selected from the class consisting of lower olefins and lower alkyl monohalides is reacted with a compound selected from the class consisting of aromatic hydrocarbons and halohydrocarbons in the presence of an organo-metal halide complex catalyst of the Friedel-Crafts type to form a crude alkylated product, the step of removing dispersed organo-metal halide complex catalyst from the crude alkylated product which comprises agitating said crude product and adding water thereto in such quantity that the specific electrical conductivity of the resulting crude product is less than about $8 \times 10^{-12}$ mhos per cubic centimeter at 25° C.

9. In a process for the preparation of ethylbenzene wherein ethylene is reacted with benzene in the presence of an aluminum chloride complex catalyst of the Friedel-Crafts type to form a crude ethylbenzene, the step of removing dispersed aluminum chloride complex catalyst from the crude ethylbenzene which comprises treating said crude ethylbenzene with a proportion of water just sufficient to precipitate the catalyst dispersed in said product but insufficient to wet said product.

10. In a process for the preparation of ethylbenzene wherein ethylene is reacted with benzene in the presence of an aluminum chloride complex catalyst of the Friedel-Crafts type to form a crude ethylbenzene, the step of removing dispersed aluminum chloride complex catalyst from the crude ethylbenzene which comprises mixing a small proportion of water with said crude ethylbenzene in an amount of between about 0.001 and about 0.2 part by weight of water per 100 parts of said crude ethylbenzene.

11. In a process for the preparation of ethylbenzene wherein ethylene is reacted with benzene in the presence of an aluminum chloride complex catalyst of the Friedel-Crafts type to form a crude ethylbenzene, the step of removing dispersed aluminum chloride complex catalyst from the crude ethylbenzene which comprises agitating said product and adding water thereto at a temperature between about 10° C. and about 75° C. in such quantity that the specific electrical conductivity of the resulting crude product is less than about $8 \times 10^{-12}$ mhos per cubic centimeter at 25° C.

HAROLD A. ROBINSON.